(12) United States Patent
Narkar et al.

(10) Patent No.: US 8,537,797 B2
(45) Date of Patent: Sep. 17, 2013

(54) ENHANCED REGISTRATION MESSAGES IN INTERNET PROTOCOL MULTIMEDIA SUBSYSTEMS

(75) Inventors: Vishal Narkar, Bellevue, WA (US); Nilesh Ranjan, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 357 days.

(21) Appl. No.: 12/856,519

(22) Filed: Aug. 13, 2010

(65) Prior Publication Data

US 2012/0039312 A1 Feb. 16, 2012

(51) Int. Cl.
*H04Q 7/24* (2006.01)

(52) U.S. Cl.
USPC .................................. 370/338; 455/456.1

(58) Field of Classification Search
USPC .............. 370/328–338, 389, 392; 455/404.2, 455/456.1–456.6, 457
See application file for complete search history.

(56) References Cited

U.S. PATENT DOCUMENTS

| | | | |
|---|---|---|---|
| 6,741,872 B1 * | 5/2004 | Pinault | 455/564 |
| 2006/0030337 A1 * | 2/2006 | Nowak | 455/456.2 |
| 2006/0114885 A1 * | 6/2006 | Baek et al. | 370/352 |
| 2008/0182614 A1 | 7/2008 | Cormier et al. | |

FOREIGN PATENT DOCUMENTS

| | | |
|---|---|---|
| KR | 1020060087912 | 8/2006 |
| KR | 1020060114633 | 11/2006 |

OTHER PUBLICATIONS

International Search Report and Written Opinion for PCT/US2011/047685; Applicant: T-Mobile; Application filed Aug. 12, 2011; Date of Mailing Jan. 17, 2012; 8 pages.

* cited by examiner

*Primary Examiner* — Pao Sinkantarakorn
(74) *Attorney, Agent, or Firm* — Perkins Coie LLP

(57) ABSTRACT

An enhanced Session Initiation Protocol ("SIP") registration message having extended header information that is used by an Internet Protocol Multimedia Subsystem ("IMS") core to determine the registration status of a mobile device and the physical location of the mobile device. The extended header information includes hardware and subscriber identifiers, such as an International Mobile Equipment Identity ("IMEI") and International Mobile Subscriber Identity ("IMSI"). The IMS core queries an equipment identity register to validate IMEI/IMSI identifiers in the header to determine whether to deny registration to a mobile device. The IMS core also queries a capability database using an IMEI to determine which location determination techniques are supported by or suitable for the associated mobile device.

20 Claims, 4 Drawing Sheets

*FIG. 2*

| | |
|---|---|
| REGISTER sip:telco.com SIP/2.0 | |
| Contact: | +sip.instance="123456789101123", <sip:+1-972-555-222@telco.com> |
| Via: | SIP/2.0/UDP pr.telco.com |
| To: | sip:watson@telco.com |
| From: | sip:watson@telco.com |
| CSeq: | 1 REGISTER |
| Call-ID: | 12345678910@pr.telco.com |
| Authorization: | Digest imsi_id='8976541234567891', username="Bob", realm="telco.com" |
| <BODY> | |

ENHANCED REGISTRATION MESSAGES IN INTERNET PROTOCOL MULTIMEDIA SUBSYSTEMS

BACKGROUND

Internet Protocol Multimedia Subsystems ("IMS") is an architecture framework for delivering Internet Protocol ("IP") multimedia to mobile users, such as users of mobile devices. An IMS core network ("IMS core") permits wireless and wireline devices to access multimedia, messaging, and voice applications and services. IMS standards and specifications have been promulgated by the 3rd Generation Partnership Project ("3GPP"™). To ease the integration of an IMS core with Internet resources, 3GPP specifications use Internet Engineering Task Force protocols within the IMS core, such as Session Initiation Protocol ("SIP") and Diameter.

SIP is a signaling protocol used for creating, modifying and terminating two-party or multiparty sessions consisting of one or several media streams. A mobile device registers its IP address with a SIP registrar server within an IMS core by generating and sending a SIP request message with a "REGISTER" method token. Once registered, a mobile device may subsequently establish multimedia sessions via the IMS core. Standard IMS registration techniques may not permit an IMS core to ascertain the IMEI of a mobile device seeking registration. Furthermore, standard IMS registration techniques may not permit an IMS core to ascertain the hardware and software capabilities of a particular mobile device so that the IMS core may intelligently provision services to the mobile device.

BRIEF DESCRIPTION OF THE DRAWINGS

FIG. 2 illustrates an example of an enhanced SIP registration message having extended header information.

DETAILED DESCRIPTION

An enhanced Session Initiation Protocol ("SIP") registration message having extended header information that is used by an Internet Protocol Multimedia Subsystem ("IMS") core to determine the registration status of a mobile device and the physical location of the mobile device is disclosed. The extended header information includes hardware and subscriber identifiers, such as an International Mobile Equipment Identity ("IMEI") and International Mobile Subscriber Identity ("IMSI"). The IMS core queries an equipment identity register to validate IMEI/IMSI identifiers in the header to determine whether to deny registration to a mobile device. The IMS core also queries a capability database using an IMEI to determine which location determination techniques are supported by or suitable for the associated mobile device.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

A. Representative Environment

Figure 1:
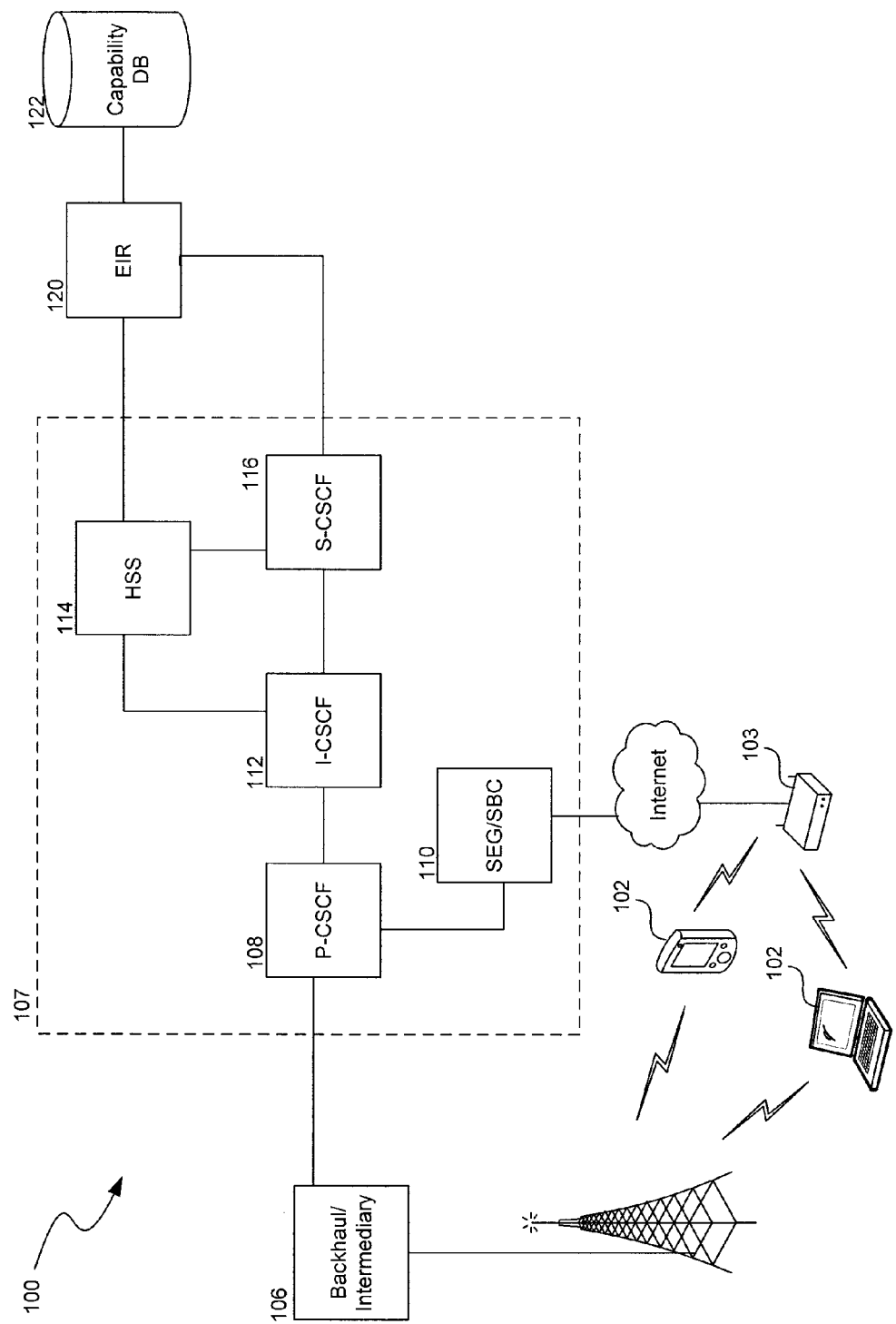
FIG. 1 is a diagram of a representative environment in which enhanced registration messages may be utilized.

FIG. 1 is a diagram of a representative environment 100 in which enhanced registration messages may be utilized. In the environment 100, mobile devices 102 are configured to communicate with, or through, a trusted radio access network ("RAN") 104 and/or an untrusted RAN 103, in order to register with and utilize an IMS core 107.

Users may employ mobile devices 102 to communicate with other users and devices. In addition, users may employ mobile devices 102 to receive, provide, or otherwise interact with location-based services. Location-based services are services that use the actual or approximate location of a mobile device to provide, enhance, or supplement a service to the mobile device. Location-based services include, but are not limited to, services such as emergency services (e.g., E911), asset tracking or recovery services (e.g., the tracking of a stolen car), location-based alerts or advertising services (e.g., targeted advertisements that depend on the location of a mobile device user), social networking services (e.g., services that report the relative location of friends or family), and/or the like. Once a mobile device 102 has successfully registered with the. IMS core 107, the device may establish multimedia sessions managed by the IMS core in order to access applications and services that facilitate communication, location-based services and/or other services.

Mobile devices 102 may include virtually any devices for communicating over a wireless network. Such devices include mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Given such variety, mobile devices 102 may range widely in terms of features and capabilities. As one example, mobile devices may have widely different hardware and software configurations that affect which location determination techniques may be utilized to locate the physical location of a mobile device (e.g., its latitude and longitude). As another example, the configuration of a mobile device may affect the performance (e.g., accuracy, precision, time to fix) of a location determination technique used to physically locate the device. The configuration of a mobile device may also affect its capability to utilize other types of applications or services besides location-based services. For example, the configuration of a mobile device may affect its capability to use multimedia gaming applications, instant messaging applications, etc.

Mobile devices 102 typically include a processing unit, volatile memory and/or nonvolatile memory, a power supply, one or more network interfaces, an audio interface, a display, a keypad or keyboard and other input and/or output interfaces. The various components of a mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP clients capable of generating, transmitting and interpreting syntactically correct SIP messages. SIP clients permit the mobile device to register with and communicate via the ISM core 107.

Many mobile devices 102 are associated with an International Mobile Equipment Identity or IMEI Software Version (herein both are referred to as "IMEI"). An IMEI is a unique or semi-unique hardware identifier that includes information on the origin, model, and serial number of a mobile device. Some mobile devices that try to register with the IMS core 107 may not have an IMEI. For example, a laptop that only connects to the IMS core via a VOIP software client may not have an IMEI. In some examples, the IMS core may generate a pseudo-IMEI for a mobile device based upon an International Mobile Subscriber Identity and/or Globally Routable User Agent URI ("GRUU") associated with the mobile device. For example, an S-CSCF (described herein) within the IMS core may generate a pseudo-IMEI for a VOIP soft client, an iPAD®, or laptop computer. Such a pseudo-IMEI may then be utilized in the methods described herein. Some mobile devices may have one or more unique or semi-unique mobile device hardware identifiers that are comparable to an IMEI, such as a Mobile Equipment Identifier ("MEID") or Electronic Serial Number ("ESN"). Although the term "IMEI" is used subsequently herein, one having skill in the art will appreciate that the disclosed methods may alternatively or additionally use other comparable mobile device hardware identifiers to determine the capabilities of a mobile device accessing the IMS core.

A mobile device 102 may also be associated with an International Mobile Subscriber Identity ("IMSI"), which is an internationally unique number used to identify a mobile subscriber or user. A subscriber's IMSI may be stored in a removable user identity card installed in a mobile device 102, such as a subscriber identity module ("SIM") card, Removable User Identity Module ("R-UIM") card, CDMA Subscriber Identify Module ("CSIM") card, or a Universal Integrated Circuit Card ("UICC"). The removable nature of the user identity card allows a user to change mobile devices by simply removing the card from one mobile device and inserting the card into another. Thus, the association between a mobile device and an IMSI may change over time. Furthermore, a mobile device may either be permanently or temporarily without a user identity card and therefore not associated with an IMSI.

Mobile devices 102 may connect to the IMS core 107 by a trusted RAN 104 or an untrusted RAN 103. Both types of RANs provide a first physical wireless link between mobile devices 102 and the IMS core. A single mobile device may be capable of using one or both types of RANs. The RANs 103, 104 may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

The trusted RAN 104 is a RAN operated by the operator of the IMS core 107 or another trusted party that is associated with the IMS core operator (e.g., the operator's contractor, affiliate, or industry partner). In order to wirelessly communicate via the trusted RAN, a mobile device 102 may need to pass preliminary authentication/authorization checks implemented in part by the trusted RAN. The trusted RAN is connected to and communicates with the IMS core via a dedicated backhaul (e.g., a private network that is not open to the public) and intermediary components 106. The intermediary components may include, for example, a Gateway GPRS Support Node ("GGSN"), Serving GPRS Support Node ("SGSN") or similar components that facilitate mobility management, session management, and transport for IP packet services within the trusted RAN 104.

The untrusted RAN 103 is a RAN that connects to the IMS core 107 over a public network such as the Internet. The untrusted RAN may not implement authentication/authorization tests sufficient to prevent security attacks upon the IMS core. In some examples, a mobile device 102 uses a WiFi, GAN, or UMA protocol to connect to an untrusted RAN at a wireless access point.

The intermediary components 106 and the untrusted RAN 103 are both connected to the IMS core 107. The IMS core comprises various Call Session Control Functions ("CSCF") and other components that, inter alia, provide SIP registrar and proxy functionality. The IMS core comprises a proxy CSCF ("P-CSCF") 108, an interrogating CSCF ("I-CSCF") 112, a serving CSCF ("S-CSCF") 116, a Security Gateway ("SEG")/Session Border Controller ("SBC") 110, and a Home Subscriber Server ("HSS") 114. The basic functionalities of the IMS core components are described by standards promulgated by the 3GPP, including 3GPP TS 23.002, version 9.2.0 Release 9, which is hereby incorporated by reference herein in its entirety.

As shown in FIG. 1, the intermediary components 106 connect the trusted RAN 104 to the IMS core 107 via the P-CSCF 108. In contrast, the untrusted network 103 connects to the P-CSCF 108 indirectly via the SEG/SBC 110. The SEG/SBC may establish a secure IP tunnel between a mobile device 102 and the IMS core. In some examples, a trusted network 104 may connect to the P-CSCF via the SEG/SBC. In other examples, the untrusted network may directly connect to the P-CSCF via the Internet.

In order to register with the IMS core 107, a SIP client running on a mobile device 102 generates and sends an initial SIP registration message to the IMS core via the trusted RAN 104 or untrusted RAN 103. The initial registration message comprises a REGISTER method token and extended header information, including an IMEI and IMSI associated with the mobile device 102, as described in greater detail herein. The P-CSCF 108 receives the initial SIP registration message and forwards the message to the I-CSCF 112. One having skill in the art will appreciate that in some examples, the P-CSCF may also perform some or all of the functionality of the SEG/SBC 110.

The I-CSCF 112 and/or S-CSCF 116 may utilize the IMEI/IMSI identifiers in the received registration message to generate and send a user authorization request ("UAR") to the HSS 114 via the Diameter protocol. The UAR includes, inter alia, the IMEI and IMSI associated with the mobile device 102. In some examples, the I-CSCF utilizes the SIP registration message forwarded from the P-CSCF to generate and send the UAR to the HSS and the S-CSCF implements additional standard IMS registration methods. In other examples, the I-CSCF does not generate and send the UAR, but instead queries the HSS to identify which S-CSCF to forward the registration message to. In such examples, the I-CSCF then forwards the received SIP registration message to the identified S-CSCF. As described in greater detail herein, the S-CSCF then utilizes the SIP registration message to generate and send the UAR to the HSS. The S-CSCF also implements additional standard IMS registration methods (e.g., HTTP digest or Authentication and Key Agreement ("AKA") authentication).

The HSS 114 is a master user database that contains subscription-related information such as subscriber profiles. The HSS performs authentication and authorization of a mobile device 102 and provides information about a mobile device's IP address. The HSS may perform standard IMS registration processes as described by 3GPP specifications and standards. The HSS also validates the IMEI/IMSI identifiers in the UAR in order to determine whether to deny registration to a mobile device 102. The HSS may also use a received IMEI to determine the capabilities of a mobile device. To authorize a device and determine device capabilities, the HSS is configured to use a received UAR in order to query an equipment identity register ("EIR") 120.

In some examples, the S-CSCF 116 couples to the EIR 120 directly. In such examples, the S-CSCF may validate IMEI/IMSI identifiers in order to determine whether to deny registration to a mobile device 102. In such examples, the S-CSCF may also use a received IMEI to determine the capabilities of a mobile device. To authorize a device and/or determine device capabilities, the S-CSCF may be configured to extract IMEI/IMSI information from a SIP registration message and to query the EIR using the extracted information.

The EIR 120 is a database used to identify which mobile devices 102 are permitted to the use IMS core 107. The EIR may also be utilized to identify which mobile devices are permitted to use the trusted network 104. Among other information, the EIR maintains a list of mobile devices (identified by their IMEI) which are to be banned from the network or monitored, for example because the devices have been reported stolen. Thus, as described in greater detail herein, an EIR associates an IMEI to a registration status or statuses. For example, an EIR may correlate an IMEI (or a range or set of IMEIs) to one of three different registration statuses:

black status, i.e., the device is not allowed to utilize the IMS core;
  gray status, i.e., the device is allowed to utilize the IMS core, but is monitored; or
  white status, i.e., the device is allowed to utilize the IMS core.

The EIR 120 may also correlate an IMEI to one or more IMSIs in order to define valid IMEI/IMSI combinations that are permitted to use the IMS core 107.

The EIR 120 either comprises or is connected to a capability database ("DB") 122. As described in greater detail herein, the capability database associates an IMEI to one or more device capabilities. For example, the capability database may permit the lookup, based on an IMEI, of which location determination techniques are supported by a particular mobile device's configuration. To illustrate, the capability database may permit the EIR to determine whether a mobile device 102 having a specific IMEI can be located with Global Positioning Systems (GPS) or assisted GPS ("A-GPS") methods. Rather than being coupled to the HSS via the EIR, the capability database may be connected to, or accessible via, other components within the environment 100. In some examples, the EIR and/or capability database are configured to accept and respond to queries for the registration status and/or device capabilities of a device from components other than the HSS 114 and S-CSCF 116, either during IMS registration or at other times. To illustrate, in some examples, the capability database may be queried by a telephone application server, a mobile device 102, and/or a third-party server, such as a server that implements a location-based service. The EIR and/or capability database may be queried, for example, via SIP request messages or Diameter messages.

Although not shown in FIG. 1, the IMS core 107 is connected directly or indirectly to location determination components that are configured to initiate, request or coordinate location determination processes in order to determine the physical location of a mobile device 102 (e.g., its latitude and longitude). For example, the IMS core may be connected to a Gateway Mobile Location Center ("GMLC"), a SUPL Location Center ("SLC") as described by the SUPL standards available from the Open Mobile Alliance ("OMA"), and/or an Emergency SMLC ("E-SMLC") as described by the IMS specifications and technical reports of the 3GPP. These components may be configured to determine and provide the location of a mobile device to a requesting location-based service, such as an emergency service or commercial location-based service. Similarly, although not shown in FIG. 1, the IMS core is directly or indirectly connected to location-based applications or services, which utilize the determined physical location of a mobile device to provide location-based services. The IMS core may facilitate communications between the location-based services, the mobile devices 102, and location determination components.

FIG. 2 illustrates an example of an enhanced SIP registration message 200 having extended header information. A SIP client running on a mobile device 102 generates and sends a registration message to the IMS core network 107 when seeking to register with the network. As shown, the registration message comprises a request line 205, a header 215, and a body 210. The request line 205 specifies the type of request being issued (the method token "REGISTER"), a request URI ("telco.com"), and a SIP version ("SIP/2.0"). The header 215 comprises multiple header fields that provide additional information about the request or the SIP client. For example, as shown in FIG. 2, the header may comprise the following header fields: Via header 220, To header 225, From header 230, Contact header 235, CSeq header 240, Call-ID header 245, and Authorization header 250. The header may comprise fewer, different, or additional header fields than those depicted in FIG. 2. The body 210 carries any data payload and may be omitted.

A header field may be associated with one or more values. For example, as shown, the To header 225 may be associated with the value "sip:watson@telco.com." A header field may also be associated with header field parameters, which may be defined by a value. For example, as shown, the Authorization header 250 may be associated with a "realm" parameter that is defined by the value "telco.com."

The header 215 is modified in a fashion that facilitates the determination of the registration status and the physical location of the mobile device. As shown in FIG. 2, the Contact header 235 includes an IMEI 247 that is associated with the mobile device 102 that generated the registration message 200. The registration message may indicate the IMEI by associating the IMEI value with an IMEI-specific parameter 249 in the Contact header (e.g., as shown, "Contact: +sip.instance='123456789101123'"). The Contact header may also include additional contact information 257 (e.g., "<sip:+1-972-555-222@telco.com>"). As another example, although not shown, a registration message may indicate a device's IMEI by concatenating the IMEI with another value in the Contact header, by associating the IMEI with another parameter associated with the Contact header, or by including the IMEI in another header field. In the event that the mobile device that generated the registration message is not associated with an IMEI, the registration message may include a standardized "dummy" IMEI, or otherwise indicate via the registration message that the device does not have an IMEI. For example, if the mobile device is not associated with an IMEI, the registration message may use a dummy IMEI that comprises the device's IMSI plus a single check digit.

As shown in FIG. 2, the Authorization header 215 includes an IMSI 255 that is associated with the mobile device 102 that generated the registration message 200. The registration message may indicate the IMSI by associating the IMSI value with an IMSI-specific parameter 253 of the Authorization header (e.g., as shown, "Authorization: Digest imsi_id='897654123456789'"). The Authorization header may also include additional authorization information 251 (e.g., "username='Bob', realm='telco.com'"). As another example, although not shown, a registration message may indicate a device's IMSI by concatenating the IMSI with another value in the Authorization header, by associating the IMSI with another parameter associated with the Authorization header, or by including the IMSI in another header field. In the event that the mobile device is not associated with an IMSI, the message may include a "dummy" IMSI (e.g., a single repeating digit, a number selected from a particular range, all or part of the device's IMEI), or otherwise indicate via the message that the device does not have an IMSI.

The flexible syntax of SIP messages allows the IMEI and IMSI to be inserted within the header 215 in a variety of formats. However, since the components of the IMS core 107 must be able to reliably and repeatedly extract IMEI and IMSI information from all registration messages, SIP clients running on the various mobile devices 102 are configured to observe a predetermined and standardized format for indicating the IMEI/IMSI within a SIP registration message 200. Alternatively, the extended header may include a code or other identifier that indicates the selected format of the IMEI and/or IMSI information that is contained in the header.

Figure 3:
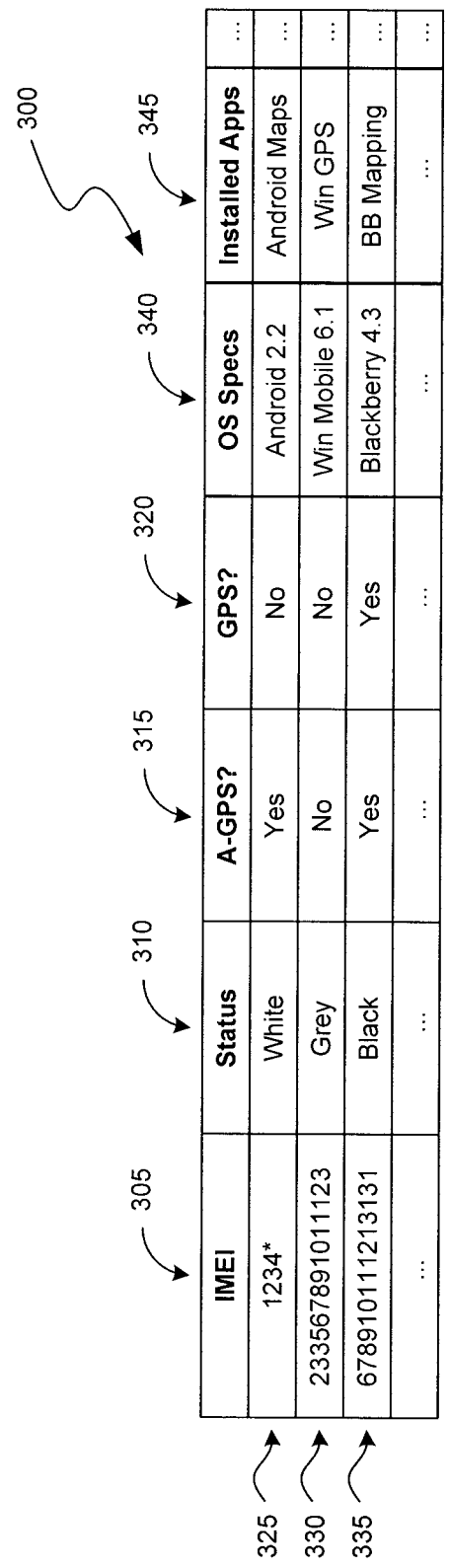
FIG. 3 shows a table schema that conceptually illustrates how a capability database stores location determination capabilities of a mobile device in association with an IMEI that identifies the mobile device.

FIG. 3 shows a table 300 schema that conceptually illustrates how a capability database 122 may store location determination capabilities of mobile devices 102 in association with IMEIs that identify each mobile device. As shown in FIG. 3, the table 300 includes a column 305 for an IMEI that uniquely identifies a mobile device 102. Each row 325, 330, 335 in the table corresponds to a single IMEI or a set of IMEIs (e.g., a range of IMEIs).

The table 300 also includes one or more location determination columns 315, 320, each of which corresponds to a different location determination technique or techniques. For example, as shown in FIG. 3, the table 300 may include an A-GPS column 315 that indicates whether the identified mobile device 102 is capable of being located using A-GPS techniques. As another example, the table may include a GPS 320 column that indicates whether the identified mobile device 102 is capable of being located using GPS techniques. Although FIG. 3 shows only two location determination columns 315, 320, the table may have any number of additional or different location determination columns that reflect whether a mobile device may be located using a particular location determination technique or techniques. For example, there may be a column for any of the following location determination techniques: Time Difference on Arrival ("TDOA") (including Uplink-TDOA (U-TDOA), Observed TDOA ("OTDOA"), Ideal Period Downlink-OTDOA ("IPDL-OTDOA"), and other TDOA procedures), Cell Identification ("CI"), CI plus Timing Advance ("CI-TA"), Assisted Global Navigation Satellite System ("AGNSS"), Round Trip Time ("RTT") measurements, CI plus RTT ("CI-RTT"), Enhanced Observed Time Difference ("E-OTD"), WiFI Data Base location, Customer provided address location, IP Location, triangulation. Although FIG. 3 shows only binary information ("Yes" or "No"), the table may alternatively or additionally include richer capability information. For example, FIG. 3 may include an indication of the performance that may be achieved by using a certain location determination technique to locate a particular mobile device (e.g., a metric reflecting the accuracy, precision, or time to fix of the technique).

The table 300 also includes one or more software capability columns 340, 345. For example, as shown in FIG. 3, the table 300 may include an operating system specification ("OS specs") column 340 that indicates the operating system installed on the identified mobile device 102. As another example, as shown in FIG. 3, the table 300 may include an installed applications ("Installed Apps") column 345 that indicates the applications installed on the identified mobile device. Installed applications may include location-based applications (e.g., mapping applications, local search applications) and/or other types of applications. The information contained in the software capability columns may be utilized by location-based services or other types of services or applications.

Although not shown in FIG. 3, the capability database may also indicate other types of capabilities of a mobile device 102 that are related to other applications or services besides location-based services. Thus the table 300 may have any number of additional or different capability columns (not shown) that reflect whether a mobile device may utilize a particular application or service. For example, the table may include an additional column that reflects whether a mobile device has sufficient hardware/software capability to use a particular multimedia gaming application.

Since the capability database 122 may be integrally formed within or otherwise associated with the EIR 120, the table 300 may also include a status column 310 that indicates the registration status of a mobile device. The registration status reflects whether the corresponding device is authorized to access the core network, and may take one or more states (e.g., "black" to indicate that the mobile device is not authorized to access the network, "white" to indicates that the mobile device is authorized to access the network, and "grey" to indicate that the device may access the network but have limited use of certain network features or services). For example, as shown in row 335, if a mobile device 102 with the IMEI "678910111213131" has been reported stolen, the table may associate that IMEI with a black status. As another example, as shown in row 325, if a group of IMEIs that begin with the sequence "1234" are known to interoperate with the IMS core 107, the table may associate that range of IMEIs with a white status. Although not shown, the table may also include an IMSI column that defines valid IMSI/IMEI combinations. These combinations may indicate which group of IMSIs (if any) may be utilized in conjunction with a particular mobile device.

Figure 4:
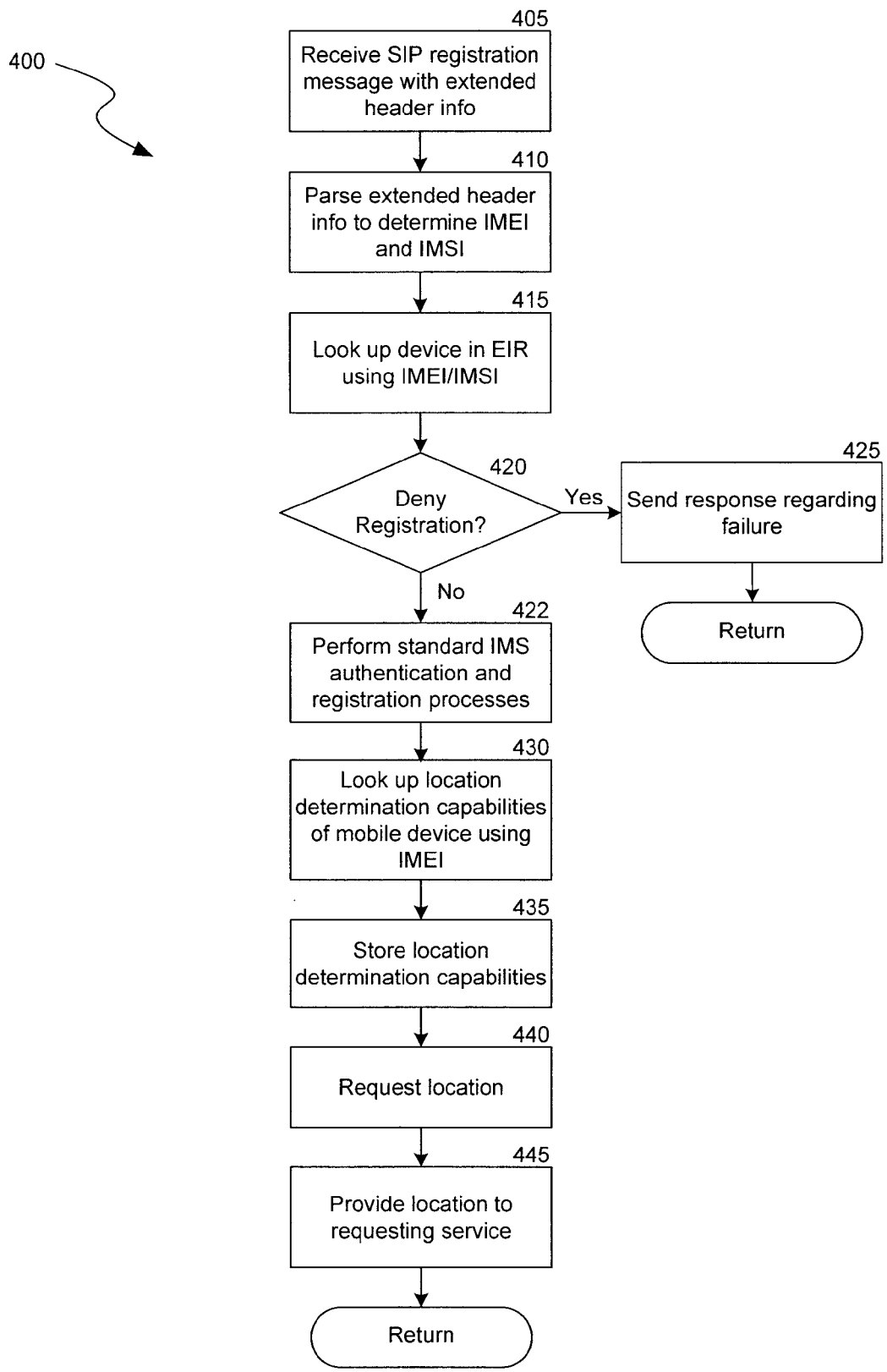
FIG. 4 is a logical flow diagram of a process for utilizing a SIP registration message having extended header information in order to determine the registration status of a mobile device and determine the location of the mobile device.

FIG. 4 is a logical flow diagram of a process 400 for utilizing a SIP registration message 200 having extended header information in order to determine the registration status of a mobile device 102 and determine the location of the mobile device. As described in greater detail herein, the various blocks of process 400 may be performed by components within the IMS core 107.

The process 400 begins at block 405, when the IMS core 107 receives a SIP registration message 200 that has extended header information, including IMEI and IMSI information, that was sent from the mobile device 102 associated with the IMEI and IMSI. The IMS core 107 receives the registration message at the P-CSCF 108, which forwards the message to the I-CSCF 112.

At block 410, a component of the IMS core 107 parses the extended header information to determine the IMEI and IMSI associated with the mobile device 102 that sent the registration message 200. As described previously, the IMS core will be able to extract the IMEI/IMSI information so long as the SIP client on the mobile device utilized a correct predetermined format for the SIP registration message or provided that the extended header information provides information about the formatting of the SIP registration message. In some examples, the I-CSCF 112 parses the extended header information in the registration message. In other examples, the I-CSCF extracts sufficient information from the message to query the HSS 114 for the identity of the S-CSCF 116 that is assigned to handle the registration message. The I-CSCF forwards the message to the identified S-CSCF, and the identified S-CSCF parses the extended header information in the registration message.

At block 415, the IMS core 107 looks up the device in the EIR 120 using the determined IMEI and IMSI in order to determine the status of the mobile device 102 and validate the IMSI/IMEI combination.

To determine the status of the mobile device, a component of the IMS core (e.g., the I-CSCF 112 or S-CSCF 116) generates and sends a UAR comprising the IMEI and IMSI to the HSS 114. In some examples, the UAR may reflect the IMSI and IMEI information in a Session ID field and/or Username field. When the HSS receives the UAR, the HSS queries the EIR using the received IMEI and IMSI to determine the status of the mobile device. In turn, the EIR looks up the IMEI within the EIR database to determine if the IMEI is associated with a black status, grey status or white status. The EIR may also utilize the IMEI and IMSI to verify that the two values represent a valid combination. The EIR sends the status of the mobile device (e.g., black, grey, or white status; valid/invalid combination of subscriber and mobile device) to the HSS.

Alternatively, rather than send a UAR comprising the IMEI and IMSI to the HSS 114, the S-CSCF 116 may query the EIR directly in order to determine the status of the mobile device. In response, the EIR sends the status of the mobile device to the S-CSCF.

At decision block 420, the IMS core 107 determines whether to deny registration to the requesting mobile device 102 due to a determined status. If the IMS core determines that it should deny registration (e.g., due to a black status or invalid combination), at block 425, the IMS core sends a response to the mobile device 102 regarding the registration failure. The process 400 then returns.

To determine whether to deny registration to the requesting mobile device, the HSS 114 reports to the I-CSCF 112 or S-CSCF 116 via a user authorization answer message ("UAA") that the mobile device cannot register with the IMS core. The UAA may specify a failed attribute value pair. In turn, the I-CSCF or S-CSCF sends a SIP response message to the mobile device that indicates a client error status code (e.g., status code "403 Forbidden"). The P-CSCF 108 may forward the response message to the mobile device. Alternatively, the S-CSCF 116 directly interprets the response from the EIR to determine whether to deny registration. The S-CSCF then sends a SIP response message to the mobile device that indicates a client error status code (e.g., status code "403 Forbidden"). The P-CSCF 108 may forward the response message to the mobile device.

If the IMS core 107 determines that it should allow registration on the basis of the received IMEI/IMSI at decision block 420, processing proceeds to block 422. At block 422, the IMS core implements standard IMS authentication and registration processes to continue registering the mobile device 102 with the IMS core. If a dummy IMSI was utilized in the registration message 200 or the registration message indicated that no IMSI is associated with the mobile device, device authentication may proceed according to HTTP digest authentication mechanisms. Otherwise, device authentication may proceed according to AKA authentication mechanisms. To initiate standard processes, the HSS 112 sends a UAA to the I-CSCF 112 or S-CSCF 116 indicating that the IMSI and IMEI are valid. Alternatively, the S-CSCF may initiate standard processes directly after interpreting the response received from the EIR. To complete IMS core registration, for example, the S-CSCF may send an authentication challenge to the mobile device with authentication vectors supplied by the HSS, and if the challenge is satisfied, complete the registration of the mobile device and notify the HSS so that it may bind the IP address of the mobile device.

At block 430, the IMS core 107 looks up the location determination capabilities of the requesting mobile device 102 using the determined IMEI. The HSS or S-CSCF may perform block 430 in conjunction with any other registration processes, for example, blocks 415, 420, and/or 422. To look up the location determination capabilities, the HSS or S-CSCF may query the EIR 120 using the received IMEI. The EIR looks up the capabilities of the mobile device in the capability database 122 using the received IMEI, and returns a message to the HSS or S-CSCF indicating the location determination capabilities of the mobile device. For example, the EIR may return a message to the HSS or S-CSCF indicating that the mobile device can be located using GPS and A-GPS techniques. In some examples, the HSS 112, S-CSCF, or another component directly queries the capability DB without interaction by the EIR. In other examples, a third-party server or telephone application server queries the EIR or capability DB for the location determination capabilities of the requesting mobile device using the device's IMEI or another identifier. Such a query may occur at any time, including times other than IMS registration.

At block 435, the IMS core 107 stores the location determination capabilities of the mobile device 102. For example, the HSS 114 may store the determined capabilities in association with the IP address of the mobile device or a user profile in the HSS. As another example, the HSS or another IMS core component may store the location determination capabilities in association with an ongoing session involving the mobile device in a session table. For example, the HSS or another component may store the capabilities in conjunction with session information such as: the IMSI of the mobile device, the IP address of the mobile device, and/or a Media Access Control ("MAC") address associated with an access point utilized by the mobile device.

At block 440, the IMS core 107 requests and receives the physical location of the mobile device 102. The request indicates one or more location determination techniques that fall within the capabilities of the mobile device that should be utilized to determine the device's physical location. To do so, the IMS core may query the HSS 114 or another system component that stored the location determination capabilities of the mobile device. Alternatively, or additionally, another component that is associated with the trusted network 104 and/or the IMS core (e.g., a GMLC, E-SMLC or SLC) may request that the IMS core provide an indication of location determination techniques that fall within the capabilities of the mobile device. The other component may then request or otherwise determine the physical location of the mobile device using an indicated location determination technique.

At block 445, the IMS core 107 or another associated component (e.g., a GMLC, E-SMLC or SLC) provides the received physical location of the mobile device 102 to a location-based service that has requested the mobile device's location. For example, an E-CSCF may provide the received physical location to an emergency services network in order to route an emergency call originating from the mobile device. As another example, the S-CSCF 116 may provide the received physical location to a commercial location-based service such as a mapping service. The requesting location-based service uses the mobile device's location to provide services that are tailored to the physical location of the device.

Although not shown, at blocks 430-445, the IMS core 107 may also look up, store and utilize information relating to other capabilities of the mobile device 102 using the determined IMEI (or a portion thereof). For example, the IMS core may determine whether other types of applications or services (e.g., gaming, messaging) are supported by the configuration of the mobile device. The identified capabilities of the mobile device may be used to customize services for the particular mobile device.

Conclusion

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps, or employ systems having steps, in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

While certain aspects of the invention are presented below in certain claim forms, the applicant contemplates the various aspects of the invention in any number of claim forms. Accordingly, the applicant reserves the right to add additional claims after filing the application to pursue such additional claim forms for other aspects of the invention.

We claim:

1. A method for registering a mobile device with an Internet Protocol Multimedia Subsystems (IMS) core network and determining the location determination capabilities of the mobile device, the method comprising:
receiving a Session Initiation Protocol (SIP) registration message with extended header information from a requesting mobile device, the extended header information including an indication of an International Mobile Equipment Identity (IMEI) of the requesting mobile device and an indication of an International Mobile Subscriber Identity (IMSI) associated with the requesting mobile device;
parsing the extended header information to determine the IMEI and the IMSI of the requesting mobile device;
retrieving a registration status of the requesting mobile device using the IMEI of the requesting mobile device;
determining whether the combination of the IMEI and IMSI is a valid combination;
determining whether to deny registration of the requesting mobile device with the IMS core based at least in part on the retrieved registration status of the requesting mobile device and the validity of the combination; and
retrieving location determination capabilities of the requesting mobile device using the IMEI of the requesting mobile device in order to allow the location of the mobile device to be determined.

2. The method of claim 1, further comprising:
storing the location determination capabilities of the requesting mobile device;
requesting a physical location of the requesting mobile device using at least one of the stored location determination capabilities;
receiving the physical location of the requesting mobile device; and
providing the received physical location of the requesting mobile device to a requesting location-based service.

3. The method of claim 2, wherein the requesting location-based service uses the provided physical location to route an emergency call that originates from the requesting mobile device.

4. The method of claim 2, wherein the requesting location-based service is a commercial location-based service.

5. The method of claim 1, further comprising retrieving other capabilities of the requesting mobile device using the IMEI of the requesting mobile device.

6. The method of claim 1, wherein retrieving the location determination capabilities of the requesting mobile device further comprises retrieving a performance metric of a location determination technique that may be used to physically locate the device.

7. The method of claim 1 wherein the IMEI is contained in a contract header field of the SIP registration message.

8. The method of claim 1, wherein the IMSI is contained in an authorization header field of the SIP registration message.

9. The method of claim 1, wherein the extended header information comprises a dummy IMEI that comprises an IMSI associated with the requesting mobile device and a single check digit.

10. The method of claim 1, wherein retrieving location determination capabilities of the requesting mobile device comprises determining whether a physical location of the mobile device can be ascertained by a location determination technique selected from the group consisting of: TDOA, U-TDOA, OTDOA, IPDL-OTDOA, CI, CI-TA, GPS, A-GPS, RTT, CI-RTT, E-OTD, IP Location, WiFi Data Base location, Customer provided address location, and triangulation.

11. The method of claim 1, wherein the retrieved registration status of the requesting mobile device is a black status, a grey status, or a white status.

12. The method of claim 1, further comprising sending a response to the requesting mobile device if registration of the requesting mobile device with the IMS core is denied.

13. A non-transitory computer-readable medium containing instructions that, when executed by a computer processor, implement a method to register a mobile device with an Internet Protocol Multimedia Subsystems (IMS) core network and determine the location determination capabilities of the mobile device, the method comprising:

receiving a Session Initiation Protocol (SIP) registration message with extended header information from a requesting mobile device, the extended header information including an indication of an International Mobile Equipment Identity (IMEI) of the requesting mobile device and an indication of an International Mobile Subscriber Identity (IMSI) associated with the requesting mobile device;

parsing the extended header information to determine the IMEI and the IMSI of the requesting mobile device;

retrieving a registration status of the requesting mobile device using the IMEI of the requesting mobile device;

determining whether the combination of the IMEI and IMSI is a valid combination;

determining whether to deny registration of the requesting mobile device with the IMS core based at least in part on the retrieved registration status of the requesting mobile device and the validity of the combination; and retrieving location determination capabilities of the requesting mobile device using the IMEI of the requesting mobile device in order to allow the location of the mobile device to be determined.

14. The non-transitory computer-readable medium of claim 13, wherein the method further comprises:

storing the location determination capabilities of the requesting mobile device;

requesting a physical location of the requesting mobile device using at least one of the stored location determination capabilities;

receiving the physical location of the requesting mobile device; and providing the received physical location of the requesting mobile device to a requesting location-based service.

15. The non-transitory computer-readable medium of claim 14, wherein the requesting location-based service uses the provided physical location to route an emergency call that originates from the requesting mobile device.

16. The non-transitory computer-readable medium of claim 13, wherein the IMEI is contained in a contact header field of the SIP registration message.

17. The non-transitory computer-readable medium of claim 13, wherein the IMSI is contained in an authorization header field of the SIP registration message.

18. The non-transitory computer-readable medium of claim 13, wherein retrieving the location determination capabilities of the requesting mobile device comprises determining whether a physical location of the mobile device can be ascertained by a location determination technique selected from the group consisting of: TDOA, U-TDOA, OTDOA, IPDL-OTDOA, CI, CI-TA, GPS, A-GPS, RTT, CI-RTT, E-OTD, IP Location, WiFi Data Base location, Customer provided address location, and triangulation.

19. The non-transitory computer-readable medium of claim 13, further comprising sending a response to the requesting mobile device if registration of the requesting mobile device with the IMS core is denied.

20. The non-transitory computer-readable medium of claim 13, wherein the extended header information comprises a dummy IMEI that comprises an IMSI associated with the requesting mobile device and a single check digit.

\* \* \* \* \*